(12) United States Patent
Hong et al.

(10) Patent No.: US 8,075,799 B2
(45) Date of Patent: Dec. 13, 2011

(54) CARBON NANOPARTICLE-CONTAINING HYDROPHILIC NANOFLUID WITH ENHANCED THERMAL CONDUCTIVITY

(75) Inventors: Haiping Hong, Rapid City, SD (US); Jesse Wensel, Boise, ID (US)

(73) Assignee: South Dakota School of Mines and Technology, Rapid City, SD (US)

( * ) Notice: Subject to any disclaimer, the term of this patent is extended or adjusted under 35 U.S.C. 154(b) by 933 days.

(21) Appl. No.: 11/810,303

(22) Filed: Jun. 5, 2007

(65) Prior Publication Data

US 2008/0302998 A1    Dec. 11, 2008

(51) Int. Cl.
*C09K 3/18*    (2006.01)

(52) U.S. Cl. ............... 252/70; 252/71; 252/73; 252/74; 508/113

(58) Field of Classification Search ............... 252/70, 252/73, 74, 71; 508/113
See application file for complete search history.

(56) References Cited

U.S. PATENT DOCUMENTS

| | | | |
|---|---|---|---|
| 4,717,498 A | 1/1988 | Maxon | |
| 4,849,127 A | 7/1989 | Maxon | |
| 6,221,275 B1 * | 4/2001 | Choi et al. | 252/74 |
| 6,432,320 B1 * | 8/2002 | Bonsignore et al. | 252/70 |
| 6,811,720 B2 * | 11/2004 | Qu | 252/70 |
| 6,828,282 B2 | 12/2004 | Moy et al. | |
| 6,858,157 B2 * | 2/2005 | Davidson et al. | 252/70 |
| 7,348,298 B2 * | 3/2008 | Zhang et al. | 508/113 |
| 7,470,650 B2 * | 12/2008 | Zhang et al. | 508/113 |
| 2002/0100578 A1 * | 8/2002 | Withers et al. | 165/80.4 |
| 2004/0206841 A1 * | 10/2004 | Morita et al. | 242/348.2 |
| 2007/0120088 A1 * | 5/2007 | Yang et al. | 252/73 |
| 2007/0215253 A1 * | 9/2007 | Dasch et al. | 148/577 |

OTHER PUBLICATIONS

Bourikas, et al., Environ. Sci. Technol., 39(11): 4100-4108 (2005).
Choi et al., "Anomalous Thermal Conductivity Enhancement in Nanotube Suspensions", Applied Physics Letters, 2001, vol. 79, No. 14, pp. 2252-2254.
Eastman, et al., "Anomalously Increased Effective Thermal Conductivities of Ethylene Glycol-Based Nanofluids Containing Copper Nanoparticles," Applied Physics Letters, 2001, vol. 78, No. 6, pp. 718-720.
Eastman, et al.., "Thermal transport in nanofluids," *Annual Review of Materials Research*, 2004, 34:219-246.
Keblinski, et al., "Nanofluids for Thermal Transport", Materials Today, Jun. 2005, pp. 36-44.
Xie, et al., "Nanofluids Containing Multiwalled Carbon Nanotubes and Their Enhanced Thermal Conductivities", J. Appl. Phys., 2003, vol. 94, No. 8, pp. 4967-4971.
Wen, et al., "Effective Thermal Conductivity of Aqueous Suspensions of Carbon Nanotubes (Carbon Nanotube Nanofluids)", J. Thermophys. Heat Transfer, 2004, vol. 18, pp. 481-485.
U.S. Appl. No. 11/494,954, filed Jul. 28, 2006, Hong, Haiping, et al.

\* cited by examiner

*Primary Examiner* — Khanh Tuan Nguyen
(74) *Attorney, Agent, or Firm* — Gordon & Rees LLP

(57) ABSTRACT

The present invention relates to a nanofluid that contains carbon nanoparticles, metal oxide nanoparticles and a surfactant in a thermal transfer fluid. The present invention also relates to processes for producing such a nanofluid with enhanced thermal conductive properties.

19 Claims, No Drawings

CARBON NANOPARTICLE-CONTAINING HYDROPHILIC NANOFLUID WITH ENHANCED THERMAL CONDUCTIVITY

GOVERNMENT FUNDING

The invention described herein was made with government support under United States Army Research Laboratories, Cooperative Agreement DAAD19-02-0011 CFDA #12.630. The U.S. Government has certain rights in this invention.

TECHNICAL FIELD

The present invention relates to a nanofluid that contains carbon nanoparticles, metal oxide nanoparticles and a surfactant in a thermal transfer fluid. The present invention also relates to processes for producing such a nanofluid with enhanced thermal conductive properties.

BACKGROUND OF THE INVENTION

Conventional heat transfer fluids such as water, mineral oil, and ethylene glycol play an important role in many industries including power generation, chemical production, air conditioning, transportation, and microelectronics. However, their inherently low thermal conductivities have hampered the development of energy-efficient heat transfer fluids that are required in a plethora of heat transfer applications. It has been demonstrated recently that the heat transfer properties of these conventional fluids can be significantly enhanced by dispersing nanometer-sized solid particles and fibers (i.e. nanoparticles) in fluids (Eastman, et al., Appl. Phys. Lett. (2001), 78(6):718-720; Choi, et al., Appl. Phys. Lett. (2001), 79(14):2252-2254). This new type of heat transfer suspension is referred to herein as a nanofluid. In particular, carbon nanotube-containing nanofluids provide several advantages over conventional fluids, including thermal conductivities far above those of traditional solid/liquid suspensions, a nonlinear relationship between thermal conductivity and concentration, strongly temperature-dependent thermal conductivity, and a significant increase in critical heat flux. Each of these features is highly desirable for thermal systems and together, they make nanofluids good candidates for the next generation of heat transfer fluids.

The observed substantial increases in the thermal conductivities of nanofluids can have broad industrial applications and can also potentially generate numerous economical and environmental benefits. Enhancement in the heat transfer ability could translate into high energy efficiency, better performance, and low operating costs. The need for maintenance and repair can also be minimized by developing a nanofluid with a better wear and load-carrying capacity. Consequently, classical heat dissipating systems widely used today can become smaller and lighter, thus resulting in better fuel efficiency, less emission, and a cleaner environment.

Nanoparticles of various materials have been used individually to make heat transfer fluids, including copper, aluminum, copper oxide, alumina, titania, and carbon nanotubes (Keblinski, et al, Material Today, (2005), 36-44). Of these nanoparticles, carbon nanotubes show the greatest promise due to their excellent chemical stability and extraordinary thermal conductivity. Carbon nanotubes are macromolecules having the shape of a long thin cylinder and thus have a high aspect ratio. There are two main types of carbon nanotubes: single-walled nanotubes ("SWNT") and multi-walled nanotubes ("MWNT"). The structure of a single-walled carbon nanotube can be described as a single graphene sheet rolled into a seamless cylinder with ends that are either open, or capped by either half fullerenes or more complex structures such as pentagons. Multi-walled carbon nanotubes contains two or more nanotubes that are concentrically nested, like rings of a tree trunk, with a typical distance of approximately 0.34 nm between layers.

Carbon nanotubes are one of the most thermally conductive materials known today. Basic research over the past decade has shown that carbon nanotubes have a thermal conductivity an order of magnitude higher than copper (3,000 watts per meter Kevin (W/mK) for multi-walled carbon nanotubes and 6,000 W/mK for single-walled carbon nanotubes). Therefore, the thermal conductivities of nanofluids containing carbon nanutubes are significantly enhanced when compared with conventional fluids. A 150% increase in conductivity of oil that contains about 1% by volume of multi-walled carbon nanotubes has been reported recently (Choi, et al., App. Phys. Lett., (2001), 79(14):2252-2254).

Several additional studies of carbon nanotube suspensions in various heat transfer fluids have also been reported. However, only moderate enhancements in thermal conductivity have been observed. Xie, et al., reported that a carbon nanotube suspension in an aqueous solution of organic liquids results in only 10-20% increases in thermal conductivity at 1% by volume of carbon nanotubes (Xie, et al., J. Appl. Phys., (2003), 94(8):4967-4971). Similarly, Wen and Ding found an about 25% enhancement in the conductivity at about 0.8% by volume of carbon nanotubes in water (Wen and Ding, J. Thermophys. Heat Trans., (2004), 18:481-483). Even at these levels, carbon nanotubes still hold great promise as being the next generation of efficient thermal transfer fluids.

Despite the extraordinarily promising thermal properties exhibited by carbon nanotube suspensions, it remains to be a serious technical challenge to effectively and efficiently disperse carbon nanotubes into aqueous or organic media to produce a nanoparticle suspension with a sustainable stability and having consistent thermal properties. Due to the hydrophobic nature of graphitic structure, unmodified carbon nanotubes are not soluble in any known solvent. They also have a very high tendency to form aggregates and extended structures of linked nanoparticles, thus leading to phase separation, poor dispersion within a matrix, and poor adhesion to the host. However, stability of the nanoparticle suspension is essential for practical industrial applications. Otherwise, the thermal properties of a nanofluid, such as thermal conductivity, will constantly change as the solid nanoparticles gradually separate from the fluid. Unfortunately, these early studies on carbon nanotube-containing nanofluids have primarily focused on the enhancement of thermal conductivity, and very little experimental data is available regarding the stability of these nanoparticle suspensions.

Accordingly, there is a need for the development of a stable nanoparticle-containing fluid and methods for efficiently dispersing carbon nanoparticles into a desired heat transfer fluid to produce a nanofluid with a sustainable stability and consistent thermal properties. Hence, the present invention provides a nanofluid, which comprises a conventional heat transfer fluid, carbon nanoparticles, metal oxide nanoparticles and a surfactant. The metal oxide nanoparticles in combination with the surfactant are used to facilitate the dispersion of the carbon nanoparticles and to increase the stability of the nanofluid. The present invention also provides methods for preparing such carbon nanoparticle-containing fluid with enhanced thermal conductive properties.

SUMMARY OF THE INVENTION

The present invention provides a nanofluid with enhanced thermal conductive properties, which comprises a conventional thermal transfer fluid, and carbon and non-carbon nanoparticles.

In accordance with an embodiment of the present invention, the nanofluid comprises a hydrophilic thermal transfer fluid, carbon nanoparticles, metal oxide nanoparticles and a surfactant. The hydrophilic nanofluid may further comprise other chemical additives to enhance the characteristics of the nanofluid.

Accordingly, in one embodiment, the nanofluid of the present invention is a composition comprising carbon nanoparticles, metal oxide nanoparticles having a pHpzc, and at least one surfactant having a net negative charge in a hydrophilic thermal transfer fluid, wherein the composition has a pH below the pHpzc of the metal oxide nanoparticles.

The nanoparticles of the present invention may include, for example, diamond nanoparticles, graphite nanoparticles, fullerenes, carbon nanotubes, and carbon fibers. The carbon nanotubes may be single walled (SWNTs) or multi-walled (MWNTs.)

The hydrophilic thermal transfer fluid may be, for example, water, alkyl alcohols, alkylene glycols, and combinations thereof. Further the alkylene glycol can be ethylene glycol or diethylene glycol.

Exemplary metal oxides are MgO, CuO and $Al_2O_3$.

Exemplary surfactants are sodium dodecylbenzenesulfonate (SDBS) and sodium dodecyl sulfate (SDS).

In a specific example, the nanofluids comprise SWNTs, along with metal oxide (MgO, CuO or $Al_2O_3$) nanoparticles, and SDS or SDBS, at a pH of between 7 and 9.

The present invention also includes a method for making a nanofluid comprising the steps of: mixing together carbon nanoparticles, metal oxide nanoparticles having a pHpzc, and at least one surfactant having a net negative charge into a hydrophilic thermal transfer fluid; and adjusting the pH below the pHpzc of the metal oxide nanoparticles.

Other aspects of the present invention are found throughout the specification.

DETAILED DESCRIPTION OF THE INVENTION

The present invention relates to nanofluids that comprise carbon nanoparticles, metal oxide nanoparticles and a surfactant in a thermal transfer fluid. Additionally, the nanofluid may further comprise chemical additives to provide other desired chemical and physical characteristics, such as antiwear, corrosion protection and thermal oxidative properties.

While not wishing to be bound by any particular scientific theory, it is believed that there is a charge attraction between the nonpolar region of the surfactant molecules and the carbon nanoparticles. This interaction forms a shell around the carbon nanoparticles, with the charged head region of the surfactant molecules oriented towards the outside. This facilitates the dispersion of the carbon nanoparticles in the fluid thus preventing precipitation from the fluid, which in turn enhances thermal conductivity. To further enhance thermal conductivity, metal oxide nanoparticles are also added to the thermal transfer fluid. These positively charged metal oxide nanoparticles repel one another and further enhance stability and thermal conductivity of the nanofluid.

As used in this disclosure, the singular forms "a", "an", and "the" may refer to plural articles unless specifically stated otherwise. To facilitate understanding of the invention set forth in the disclosure that follows, a number of terms are defined below.

Definitions:

The term "aspect ratio" refers to a ratio of the length over the diameter of a particle.

The term "carbon nanoparticle" refers to a nanoparticle which contains primarily carbon, including diamond, graphite, fullerenes, carbon nanotubes, carbon fibers, and combinations thereof.

The term "SWNT" refers to a single-walled carbon nanotube.

The term "D-SWNT" refers to a double-walled carbon nanotube.

The term "MWNT" refers to a multi-walled carbon nanotube that contains two or more walls. Thus, D-SWNT is included in the definition of MWNT.

The term "F-SWNT" refers to a fluorinated SWNT.

The term "carbon nanotube" refers to SWNT, MWNT, and structural variations and modification thereof, including configurations, structural defects and variations, tube arrangements, chemical modification and functionalization, and encapsulation.

The term "nanoparticle" refers to a particle having at least one dimension that is no greater than 500 nm, and sometimes no greater than 100 nm, and includes, for example, "nanospheres," "nanorods," "nanocups," "nanowires," "nanoclusters," "nanolayers," "nanotubes," "nanocrystals," "nanobeads," "nanobelts," and "nanodisks."

The term "nanoscale" refers to a dimension that is no greater than 500 nm, and sometimes no greater than 100 nm. The terms "nanoscale particle" and "nanoparticle" are used interchangeably in the present invention.

The term "pH point of zero charge", or "pHpzc" refers to the pH value of a metal oxide nanoparticle-containing fluid at which the metal oxide nanoparticle exhibits a neutral surface charge. The pHpzc can be measured by any known method, such as the one described by Bourikas, et al., Environ. Sci. Technol., 39(11): 4100-4108 (2005).

The term "surfactant" refers to a molecule having surface activity, including wetting agents, dispersants, emulsifiers, detergents, and foaming agents, etc.

Carbon Nanoparticles:

Carbon nanoparticles have a high heat transfer coefficient and high thermal conductivity, which often exceed these of the best metallic material. The carbon nanoparticles for use in the present invention comprise elemental carbon. Many forms of carbon nanoparticles are suitable for use in the present invention, including carbon nanotubes, diamonds, fullerenes, graphite, carbon fibers, and combinations thereof.

Carbon nanotubes ("CNT") are macromolecules in the shape of a long, thin cylinder, often with a diameter of a few nanometers. The basic structural element in a carbon nanotube is a hexagon, which is the same as that found in graphite. Based on the orientation of the tube axis with respect to the hexagonal lattice, a carbon nanotube potentially has three different configurations: armchair, zigzag, and chiral (also known as spiral). In armchair configuration, the tube axis is perpendicular to two of six carbon-carbon bonds of the hexagonal lattice. In zigzag configuration, the tube axis is parallel to two of six carbon-carbon bonds of the hexagonal lattice. Both these two configurations are achiral. In chiral configuration, the tube axis forms an angle other than 90 or 180 degrees with any of six carbon-carbon bonds of the hexagonal lattice. Nanotubes with these three configurations often exhibit different physical and chemical properties. For example, an armchair nanotube is always metallic, whereas a zigzag nanotube may be metallic or semiconductive, depending on the diameter of the nanotube. All three types of different configurations of nanotubes are expected to be very good thermal conductors along the tube axis, exhibiting a property known as "ballistic conduction," but are also good insulators laterally to the tube axis.

In addition to the common hexagonal structure, the cylinder of a carbon nanotube may also contain other sized rings, such as pentagons and heptagons. Replacement of some regular hexagons with pentagons and/or heptagons may cause cylinders to bend, twist, or change diameter, and thus lead to some interesting structures such as "Y-," "T-," and "X-junctions," and different physical and chemical properties. These structural variations and configurations can be found in both SWNT and MWNT. The present invention is not limited to any particular configuration and structural variation. The carbon nanotubes used in the present invention may be in the configuration of armchair, zigzag, chiral, or combinations thereof. The carbon nanotubes may also contain structural elements other than hexagon, such as pentagon, heptagon, octagon, or combinations thereof.

Another structural variation, which is specific for MWNT molecules, is the arrangement of multiple tubes in a MWNT molecule. A perfect MWNT is like a stack of graphene sheets rolled up into concentric cylinders, with each wall parallel to the central axis. However, the tubes may also be arranged so that an angle between the graphite basal planes and the tube axis is formed. Such MWNTs are known as a "stacked cone", "Chevron," "bamboo," "ice cream cone," or "piled cone structure." A stacked cone MWNT may reach a diameter of about 100 nm. In spite of these structural variations, all MWNTs are suitable for the present invention, as long as they have excellent thermal conductive properties.

Carbon nanotubes used in the present invention may also encapsulate other elements and/or molecules within their enclosed tubular structures. Such elements include Si, Ti, V, Cr, Mn, Fe, Co, Ni, Cu, Y, Zr, Mo, Ta, Au, Th, La, Ce, Pr, Nb, Gd, Th, Dy, Ho, Er, Tm, Yb, Lu, Mo, Pd, Sn, and W. Such molecules include alloys of these elements such as alloys of Cobalt with S, Br, Pb, Pt, Y, Cu, B, and Mg, and compounds such as the carbides (i.e. TiC, MoC, etc.) The present of these elements, alloys and compounds within the core structure of fullerenes and nanotubes may enhance the thermal conductivity of these nanoparticles, which then translates to a nanofluid with a higher thermal conductivity when these nanoparticles are suspended in a heat transfer fluid.

Carbon nanoparticles used in the present invention may also be chemically modified or functionalized. Covalent functionalization of carbon nanoparticles, especially carbon nanotubes and fullerenes, has commonly been accomplished by three different approaches, namely, thermally activated chemistry, electrochemical modification, and photochemical functionalization. The most common method of thermally activated chemical functionalization is an addition reaction on the sidewalls. For example, the extensive treatment of a nanotube with concentrated nitric and sulfuric acids leads to the oxidative opening of the tube caps as well as the formation of holes in the sidewalls. This produces a nanotube decorated with carboxyl groups, which can be further modified through the creation of amide and ester bonds to generate a vast variety of functional groups. The nanotube molecule may also be modified through addition reactions with various chemical reagents, such halogens and ozone. Unlike thermally controlled modification, electrochemical modification of nanotubes may be carried out in a more selective and controlled manner. Interestingly, a SWNT can be selectively modified or functionalized either on the cylinder sidewall or the optional end caps. These two structurally distinct moieties often display different chemical and physical characteristics. The functional groups on functionalized carbon nanoparticles may be attached directly to the carbon atoms of a carbon nanoparticle or via chemical linkers, such as alkylene or arylene groups. To increase hydrophilicity, carbon nanoparticles may be functionalized with one or more hydrophilic functional groups, such as sulfonate, carboxyl, hydroxyl, amino, amide, urea, carbamate, urethane, phosphate, and/or functionalized alkyl and aryl groups (e.g., sulfonated p-aminophenyl group). To increase hydrophobicity, carbon nanoparticles may be functionalized with one or more hydrophobic alkyl or aryl groups. The functionalized carbon particle may have no less than about 2, no less than about 5, no less than about 10, no less than about 20, or no less than about 50 functional groups on average.

Carbon nanotubes are commercially available from a variety of commercial sources. SWNTs may be obtained from Carbolex (Broomall, Pa.), MER Corporation (Tucson, Ariz.), and Carbon Nanotechnologies Incorporation ("CNI", Houston, Tex.). MWNTs may be obtained from MER Corporation (Tucson, Ariz.) and Helix material solution (Richardson, Tex.). However, the present invention is not limited by the source of carbon nanotubes. In addition, many publications are available with sufficient information to allow one to manufacture nanotubes with desired structures and properties. Currently, the most common techniques are arc discharge, laser ablation, chemical vapor deposition, and flame synthesis. In general, the chemical vapor deposition has shown the most promise in being able to produce larger quantities of nanotubes at lower cost. This is usually done by reacting a carbon-containing gas, such as acetylene, ethylene, ethanol, etc., with a metal catalyst particle, such as cobalt, nickel, or ion, at temperatures above 600° C. The present invention is also not limited by the manufacturing method of the carbon nanotubes.

The selection of a particular carbon nanoparticle depends on a number of factors. The most important one is that the nanoparticle has to be compatible with an already existing base fluid (i.e., a thermal transfer fluid) discussed elsewhere herein. Other factors include heat transfer properties, cost effectiveness, solubility, dispersion and settling characteristics. The carbon nanoparticule-containing nanofluid may contain predominantly SWNTs, MWNTs, or mixtures thereof. The carbon nanoparticles in the nanofluid may also be chemically functionalized. The functionalized carbon nanoparticles may be soluble in a hydrophilic thermal transfer fluid, and are thus suitable for preparing a hydrophilic nanofluid. Alternatively, they may be soluble in a hydrophobic thermal transfer fluid, and are thus suitable for preparing a hydrophobic nanofluid.

In general, carbon nanotubes are characterized by physical and chemical properties, such as a carbon content, diameter, length, aspect ratio, and thermal conductivity. The carbon nanotubes suitable for use in the present invention may have a carbon content of no less than about 60%, no less than about 80%, no less than about 90%, no less than about 95%, no less than about 98%, or no less than about 99%. The carbon nanotubes may have a diameter of from about 0.2 to about 100 nm, from about 0.4 to about 80 nm, from about 0.5 to about 60 nm, or from about 0.5 to about 50 nm. The carbon nanotubes may have a length of no greater than about 200 micrometers, no greater than 100 micrometers, no greater than about 50 micrometers, or no greater than 20 micrometers. Furthermore, the carbon nanotubes may have an aspect ratio of no greater than 1,000,000, no greater than 100,000, no greater than 10,000, no greater than 1,000, no greater than about 500, no greater than about 200, or no greater than about 100.

Alternatively, the carbon nanotubes may have a thermal conductivity of no less than 10 W/m·K, no less than 100 W/m·K, no less than 500 W/m·K, or no less than 1,000 W/m·K.

For a functionalized carbon nanotube, it may be further characterized by its solubility in a thermal transfer fluid. The carbon nanotubes used in the present invention may have a solubility of no less than 0.01 g/L, no less than 0.05 g/L, no less than 0.1 g/L, no less than 0.5 g/L, no less than 1 g/L, no less than 2 g/L, no less than 5 g/L, or no less than 10 g/L in a desired thermal transfer fluid, either hydrophilic or hydrophobic.

The carbon particles suitable for use in the present invention may be diamond nanoparticles, graphite nanoparticles, fullerenes, or carbon fibers. Furthermore, the carbon nanoparticles may be a combination of two or more selected from diamond nanoparticles, graphite nanoparticles, fullerenes, carbon fibers, and carbon nanotubes. A combination may be a mixture of two or more nanoparticles of the same type or of different types. For examples, a combination of two nanoparticles can be a mixture of SWNT and MWNT, a mixture of two SWNTs with different properties, a mixture of two MWNT with different properties, a mixture of carbon nanotubes with graphite nanoparticles, a mixture of carbon nanotubes with diamond particles, and a mixture of carbon nanotubes with fullerenes.

Metal Oxide Nanoparticles:

A metal oxide nanoparticle is a nanoscale particle that comprises one or more metal oxides. Such metal oxides include, for example, those formed from metal and/or metalloid, either in elemental form and/or in compounds. Suitable metal/metalloid oxides include but are not limited to $Al_2O_3$, CuO, MgO, $SiO_2$, $GeO_2$, $B_2O_3$, $TeO_2$, $V_2O_5$, $BiO_2$, $Sb_2O_5$, $TiO_2$, ZnO, FeO, $Fe_2O_3$, $Fe_3O_4$, and $CrO_3$. As used herein, the chemical formula for a metal oxide nanoparticle refers to the chemical with that formula that is a component, usually the principal component, of the nanoparticle. The chemical may be a major or minor component of the nanoparticle. As such, the nanoparticle may not have the same chemical composition as the chemical formula. Furthermore, unless specified, the chemical formula of a nanoparticle represents any of the possible crystalline forms. For example, the chemical formula $Al_2O_3$ may represent alpha-, beta-, or gamma-aluminum oxide, or combinations thereof.

Suitable metal oxide nanoparticles for use in the present invention may have, for example, a pHpzc of between 6 and 10, 7 and 10, 8 and 10, and 9 and 10, etc. For example, the exemplary metal oxides, MgO, CuO and $Al_2O_3$ have a pHpzc between 9 and 10.

Thermal Transfer Fluid:

In the present invention, the major component of the nanofluid is a hydrophilic thermal transfer fluid. The hydrophilic thermal transfer fluid of the present invention includes a hydrophilic liquid that is miscible with water, including water, aliphatic alcohols, alkylene glycols, di(alkylene)glycols, monoalkyl ethers of alkylene glycols or di(alkylene) glycols, and various mixtures thereof. Suitable aliphatic alcohols contain no greater than 6 carbons and no greater than 4 hydroxyls, such as methanol, ethanol, isopropanol, and glycerol. Suitable alkylene glycols contain no greater than 5 carbons, such as ethylene glycol, propylene glycol, and 1,2-butylene glycol. Particularly, the hydrophilic thermal transfer fluid comprises ethylene glycol, propylene glycol, and mixtures thereof. Ethylene glycol and propylene glycol are excellent antifreeze agents and also markedly reduce the freezing point of water. Suitable di(alkylene)glycols contain no greater than 10 carbons, such as diethylene glycol, triethylene glycol, tetraethylene glycol, and dipropylene glycol. Commercial antifreeze coolants often contain more than one glycol compounds. For example, PRESTONE™ antifreeze (Honeywell Consumer Products Group, Danbury, Conn.) contains 95 to 100% of ethylene glycol and no greater than 5% of diethylene glycol. The mixture as used herein refers to a combination of two or more hydrophilic liquids. As used herein, the term "alkylene glycol" refers to a molecule having glycol functional moiety in its structure in general, including alkylene glycol, alkylene glycols, di(alkylene)glycols, tri(alkylene)glycols, tetra(alkylene)glycols, and their various derivatives, such as ethers and carboxylic esters.

Surfactant:

A variety of surfactants may alternatively be included in the present invention as a dispersant to facilitate uniform dispersion of nanoparticles in a desired thermal transfer fluid, and to enhance stabilization of such a dispersion as well. Typically, the surfactants used in the present invention contain an lipophilic nonpolar hydrocarbon group and a polar functional hydrophilic group. The polar functional group may be a carboxylate, ester, amine, amide, imide, hydroxyl, ether, nitrile, phosphate, sulfate, or sulfonate. The surfactants that are useful in the present invention may be used alone or in combination. Accordingly, any combination of surfactants may include anionic, cationic, nonionic, zwitterionic, amphoteric and ampholytic surfactants, so long as there is a net positive charge in the head regions of the population of surfactant molecules. In most instances, a single negatively charged surfactant is used in the preparation of the nanofluids of the present invention.

Accordingly, the surfactants for use in the present invention may be anionic, including, but not limited to, sulfonates such as alkyl sulfonates, alkylbenzene sulfonates, alpha olefin sulfonates, paraffin sulfonates, and alkyl ester sulfonates; sulfates such as alkyl sulfates, alkyl alkoxy sulfates, and alkyl alkoxylated sulfates; phosphates such as monoalkyl phosphates and dialkyl phosphates; phosphonates; carboxylates such as fatty acids, alkyl alkoxy carboxylates, sarcosinates, isethionates, and taurates. Specific examples of carboxylates are sodium cocoyl isethionate, sodium methyl oleoyl taurate, sodium laureth carboxylate, sodium trideceth carboxylate, sodium lauryl sarcosinate, lauroyl sarcosine, and cocoyl sarcosinate. Specific examples of sulfates include sodium dodecyl sulfate (SDS), sodium lauryl sulfate, sodium laureth sulfate, sodium trideceth sulfate, sodium tridecyl sulfate, sodium cocyl sulfate, and lauric monoglyceride sodium sulfate.

Suitable sulfonate surfactants include, but are not limited to, alkyl sulfonates, aryl sulfonates, monoalkyl and dialkyl sulfosuccinates, and monoalkyl and dialkyl sulfosuccinamates. Each alkyl group independently contains about two to twenty carbons and can also be ethoxylated with up to about 8 units, preferably up to about 6 units, on average, e.g., 2, 3, or 4 units, of ethylene oxide, per each alkyl group. Illustrative examples of alky and aryl sulfonates are sodium tridecyl benzene sulfonate (STBS) and sodium dodecylbenzene sulfonate (SDBS).

Illustrative examples of sulfosuccinates include, but are not limited to, dimethicone copolyol sulfosuccinate, diamyl sulfosuccinate, dicapryl sulfosuccinate, dicyclohexyl sulfosuccinate, diheptyl sulfosuccinate, dihexyl sulfosuccinate, diisobutyl sulfosuccinate, dioctyl sulfosuccinate, C12-15 pareth sulfosuccinate, cetearyl sulfosuccinate, cocopolyglucose sulfosuccinate, cocoyl butyl gluceth-10 sulfosuccinate, deceth-5 sulfosuccinate, deceth-6 sulfosuccinate, dihydroxyethyl sulfosuccinylundecylenate, hydrogenated cottonseed glyceride sulfosuccinate, isodecyl sulfosuccinate, isostearyl sulfosuccinate, laneth-5 sulfosuccinate, laureth sulfosuccinate, laureth-12 sulfosuccinate, laureth-6 sulfosuccinate, laureth-9 sulfosuccinate, lauryl sulfosuccinate, nonoxynol-10 sulfosuccinate, oleth-3 sulfosuccinate, oleyl sulfosuccinate, PEG-10 laurylcitrate sulfosuccinate, sitosereth-14 sulfosuccinate, stearyl sulfosuccinate, tallow, tridecyl sulfosuccinate, ditridecyl sulfosuccinate, bisglycol ricinosulfosuccinate, di(1,3-di-methylbutyl)sulfosuccinate, and silicone copolyol sulfosuccinates. The structures of silicone copolyol sulfosuccinates are set forth in U.S. Pat. Nos. 4,717,498; and 4,849,127.

Illustrative examples of sulfosuccinamates include, but are not limited to, lauramido-MEA sulfosuccinate, oleamido PEG-2 sulfosuccinate, cocamido MIPA-sulfosuccinate, cocamido PEG-3 sulfosuccinate, isostearamido MEA-sulfosuccinate, isostearamido MIPA-sulfosuccinate, lauramido MEA-sulfosuccinate, lauramido PEG-2 sulfosuccinate, lauramido PEG-5 sulfosuccinate, myristamido MEA-sulfosuccinate, oleamido MEA-sulfosuccinate, oleamido PIPA-sulfosuccinate, oleamido PEG-2 sulfosuccinate, palmitamido PEG-2 sulfosuccinate, palmitoleamido PEG-2 sulfosuccinate, PEG-4 cocamido MIPA-sulfosuccinate, ricinoleamido MEA-sulfosuccinate, stearamido MEA-sulfosuccinate, stearyl sulfosuccinamate, tallamido MEA-sulfosuccinate, tallow sulfosuccinamate, tallowamido MEA-sulfosuccinate, undecylenamido MEA-sulfosuccinate, undecylenamido PEG-2 sulfosuccinate, wheat germamido MEA-sulfosuccinate, and wheat germamido PEG-2 sulfosuccinate.

Some examples of commercial sulfonates are AEROSOL® OT-S, AEROSOL® OT-MSO, AEROSOL® TR70% (Cytec Inc., West Paterson, N.J.), NaSul CA-HT3 (King Industries, Norwalk, Conn.), and C500 (Crompton Co., West Hill, Ontario, Canada). AEROSOL® OT-S is sodium dioctyl sulfosuccinate in petroleum distillate. AEROSOL® OT-MSO also contains sodium dioctyl sulfosuccinate. AEROSOL® TR70% is sodium bistridecyl sulfosuccinate in mixture of ethanol and water. NaSul CA-HT3 is calcium dinonylnaphthalene sulfonate/carboxylate complex. C500 is an oil soluble calcium sulfonate.

For an anionic surfactant, the counter ion is typically sodium but may alternatively be potassium, lithium, calcium, magnesium, ammonium, amines (primary, secondary, tertiary or quandary) or other organic bases. Exemplary amines include isopropylamine, ethanolamine, diethanolamine, and triethanolamine. Mixtures of the above cations may also be used.

The surfactants for use in the present invention may also be cationic, so long as at least one surfactant bearing a net positive charge is also included. Such cationic surfactants include, but are not limited to, primarily organic amines, primary, secondary, tertiary or quaternary. For a cationic surfactant, the counter ion can be chloride, bromide, methosulfate, ethosulfate, lactate, saccharinate, acetate and phosphate. Examples of cationic amines include polyethoxylated oleyl/stearyl amine, ethoxylated tallow amine, cocoalkylamine, oleylamine, and tallow alkyl amine.

Examples of quaternary amines with a single long alkyl group are cetyl trimethyl ammonium bromide (CETAB), dodecyltrimethylammonium bromide, myristyl trimethyl ammonium bromide, stearyl dimethyl benzyl ammonium chloride, oleyl dimethyl benzyl ammonium chloride, lauryl trimethyl ammonium methosulfate (also known as cocotrimonium methosulfate), cetyl-dimethyl hydroxyethyl ammonium dihydrogen phosphate, bassuamidopropylkonium chloride, cocotrimonium chloride, distearyldimonium chloride, wheat germ-amidopropalkonium chloride, stearyl octyidimonium methosulfate, isostearaminopropal-konium chloride, dihydroxypropyl PEG-5 linoleammonium chloride, PEG-2 stearmonium chloride, behentrimonium chloride, dicetyl dimonium chloride, tallow trimonium chloride and behenamidopropyl ethyl dimonium ethosulfate.

Examples of quaternary amines with two long alkyl groups are distearyldimonium chloride, dicetyl dimonium chloride, stearyl octyldimonium methosulfate, dihydrogenated palmoylethyl hydroxyethylmonium methosulfate, dipalmitoylethyl hydroxyethylmonium methosulfate, dioleoylethyl hydroxyethylmonium methosulfate, and hydroxypropyl bis-stearyldimonium chloride.

Quaternary ammonium compounds of imidazoline derivatives include, for example, isostearyl benzylimidonium chloride, cocoyl benzyl hydroxyethyl imidazolinium chloride, cocoyl hydroxyethylimidazolinium PG-chloride phosphate, and stearyl hydroxyethylimidonium chloride. Other heterocyclic quaternary ammonium compounds, such as dodecylpyridinium chloride, can also be used.

The surfactants for use in the present invention may be nonionic, including, but not limited to, polyalkylene oxide carboxylic acid esters, fatty acid esters, fatty alcohols, ethoxylated fatty alcohols, poloxamers, alkanolamides, alkoxylated alkanolamides, polyethylene glycol monoalkyl ether, and alkyl polysaccharides. Polyalkylene oxide carboxylic acid esters have one or two carboxylic ester moieties each with about 8 to 20 carbons and a polyalkylene oxide moiety containing about 5 to 200 alkylene oxide units. A ethoxylated fatty alcohol contains an ethylene oxide moiety containing about 5 to 150 ethylene oxide units and a fatty alcohol moiety with about 6 to about 30 carbons. The fatty alcohol moiety can be cyclic, straight, or branched, and saturated or unsaturated. Some examples of ethoxylated fatty alcohols include ethylene glycol ethers of oleth alcohol, steareth alcohol, lauryl alcohol and isocetyl alcohol. Poloxamers are ethylene oxide and propylene oxide block copolymers, having from about 15 to about 100 moles of ethylene oxide. Alkyl polysaccharide ("APS") surfactants (e.g. alkyl polyglycosides) contain a hydrophobic group with about 6 to about 30 carbons and a polysaccharide (e.g., polyglycoside) as the hydrophilic group. An example of commercial nonionic surfactant is FOA-5 (Octel Starreon LLC., Littleton, Colo.).

Specific examples of suitable nonionic surfactants include alkanolamides such as cocamide diethanolamide ("DEA"), cocamide monoethanolamide ("MEA"), cocamide monoisopropanolamide ("MIPA"), PEG-5 cocamide MEA, lauramide DEA, and lauramide MEA; alkyl amine oxides such as lauramine oxide, cocamine oxide, cocamidopropylamine oxide, and lauramidopropylamine oxide; sorbitan laurate, sorbitan distearate, fatty acids or fatty acid esters such as lauric acid, isostearic acid, and PEG-150 distearate; fatty alcohols or ethoxylated fatty alcohols such as lauryl alcohol, alkylpolyglucosides such as decyl glucoside, lauryl glucoside, and coco glucoside.

The surfactants for use in the present invention may be zwitterionic, which has both a formal positive and negative charge on the same molecule. The positive charge group can be quaternary ammonium, phosphonium, or sulfonium, whereas the negative charge group can be carboxylate, sulfonate, sulfate, phosphate or phosphonate. Similar to other classes of surfactants, the hydrophobic moiety may contain one or more long, straight, cyclic, or branched, aliphatic chains of about 8 to 18 carbon atoms. Specific examples of zwitterionic surfactants include alkyl betaines such as cocodimethyl carboxymethyl betaine, lauryl dimethyl carboxymethyl betaine, lauryl dimethyl alpha-carboxyethyl betaine, cetyl dimethyl carboxymethyl betaine, lauryl bis-(2-hydroxyethyl)carboxy methyl betaine, stearyl bis-(2-hydroxypropyl)carboxymethyl betaine, oleyl dimethyl gamma-carboxypropyl betaine, and lauryl bis-(2-hydroxypropyl) alphacarboxy-ethyl betaine, amidopropyl betaines; and alkyl sultaines such as cocodimethyl sulfopropyl betaine, stearyidimethyl sulfopropyl betaine, lauryl dimethyl sulfoethyl betaine, lauryl bis-(2-hydroxyethyl)sulfopropyl betaine, and alkylamidopropylhydroxy sultaines.

The surfactants for use in the present invention may be amphoteric. Examples of suitable amphoteric surfactants include ammonium or substituted ammonium salts of alkyl amphocarboxy glycinates and alkyl amphocarboxypropionates, alkyl amphodipropionates, alkyl amphodiacetates, alkyl amphoglycinates, and alkyl amphopropionates, as well as alkyl iminopropionates, alkyl iminodipropionates, and alkyl amphopropylsulfonates. Specific examples are cocoamphoacetate, cocoamphopropionate, cocoamphodiacetate, lauroamphoacetate, lauroamphodiacetate, lauroamphodipropionate, lauroamphodiacetate, cocoamphopropyl sulfonate, caproamphodiacetate, caproamphoacetate, caproamphodipropionate, and stearoamphoacetate.

The surfactants for use in the present invention may also be a polymer such as N-substituted polyisobutenyl succinimides and succinates, alkyl methacrylate vinyl pyrrolidinone copolymers, alkyl methacrylate-dialkylaminoethyl methacrylate copolymers, alkylmethacrylate polyethylene glycol methacrylate copolymers, and polystearamides.

Alternatively, the surfactant may be an oil-based dispersant, which includes alkylsuccinimide, succinate esters, high molecular weight amines, and Mannich base and phosphoric acid derivatives. Some specific examples are polyisobutenyl succinimide-polyethylenepolyamine, polyisobutenyl succinic ester, polyisobutenyl hydroxybenzyl-polyethylenepolyamine, and bis-hydroxypropyl phosphorate.

The surfactant used in the present invention may also be a combination of two or more selected from the group consisting of anionic, cationic, nonionic, zwitterionic, amphoteric, and ampholytic surfactants. Suitable examples of a combination of two or more surfactants of the same type include, but are not limited to, a mixture of two anionic surfactants, a mixture of three anionic surfactants, a mixture of four anionic surfactants, a mixture of two cationic surfactants, a mixture of three cationic surfactants, a mixture of four cationic surfactants, a mixture of two nonionic surfactants, a mixture of three nonionic surfactants, a mixture of four nonionic surfactants, a mixture of two zwitterionic surfactants, a mixture of three zwitterionic surfactants, a mixture of four zwitterionic surfactants, a mixture of two amphoteric surfactants, a mixture of three amphoteric surfactants, a mixture of four amphoteric surfactants, a mixture of two ampholytic surfactants, a mixture of three ampholytic surfactants, and a mixture of four ampholytic surfactants.

Suitable examples of a combination of two surfactants of different types include, but are not limited to, a mixture of one anionic and one cationic surfactant, a mixture of one anionic and one nonionic surfactant, a mixture of one anionic and one zwitterionic surfactant, a mixture of one anionic and one amphoteric surfactant, a mixture of one anionic and one ampholytic surfactant, a mixture of one cationic and one nonionic surfactant, a mixture of one cationic and one zwitterionic surfactant, a mixture of one cationic and one amphoteric surfactant, a mixture of one cationic and one ampholytic surfactant, a mixture of one nonionic and one zwitterionic surfactant, a mixture of one nonionic and one amphoteric surfactant, a mixture of one nonionic and one ampholytic surfactant, a mixture of one zwitterionic and one amphoteric surfactant, a mixture of one zwitterionic and one ampholytic surfactant, and a mixture of one amphoteric and one ampholytic surfactant. A combination of two or more surfactants of the same type, e.g., a mixture of two anionic surfactants, is also included in the present invention.

Other Chemical Additives:

The nanofluids of the present invention may also contain one or more other chemicals to provide other desired chemical and physical properties and characteristics, depending on whether they are hydrophobic or hydrophilic. In addition to the chemicals discussed separately below for hydrophilic and hydrophobic thermal transfer fluids, many other known types of additives such as dyes and air release agents, can also be included in finished compositions produced and/or used in the practice of the present invention. In general, the additive components are employed in nanofluids in minor amounts sufficient to enhance the performance characteristics and properties of the base fluid. The amounts will thus vary in accordance with such factors as the viscosity characteristics of the base fluid employed, the viscosity characteristics desired in the finished fluid, the service conditions for which the finished fluid is intended, and the performance characteristics desired in the finished fluid.

Suitable additional chemical additives include, but are not limited to, buffering agents, corrosion inhibitors, defoamers, and scale inhibitors.

The buffering agents may be selected from any known or commonly used buffering agents. It will be appreciated by those skilled in the art that selected buffering agents can exhibit both anti-corrosion and buffering properties. In certain formulations, for example, benzoates, borates, and phosphates can provide both buffering and anti-corrosion advantages. In addition a base can be used to adjust the pH value of a nanofluid. Illustrative examples of bases for use with this invention include commonly known and used bases, for example, inorganic bases such as KOH, NaOH, $NaHCO_3$, $K_2CO_3$, and $Na_2CO_3$. Therefore, the buffering system and base can be adapted to provide a nanofluid composition with a pH level between 7.5 and about 11.

The corrosion inhibitors may be either an organic additive or an inorganic additive. Suitable organic anti-corrosive additives include short aliphatic dicarboxylic acids such as maleic acid, succinic acid, and adipic acid; triazoles such as benzotriazole and tolytriazole; thiazoles suchs as mercaptobenzothiazole; thiadiazoles such as 2-mercapto-5-hydrocarbylthio-1,3,4-thiadiazoles, 2-mercapto-5-hydrocarbyldithio-1, 3,4-thiadiazoles, 2,5-bis(hydrocarbylthio)-1,3,4-thiadiazoles, and 2,5-(bis)hydrocarbyldithio)-1,3,4-thiadiazoles; sulfonates; and imidazolines. Suitable inorganic additives include borates, phosphates, silicates, nitrates, nitrites, and molybdates.

Suitable defoamers include components such as silicon defoamers, alcohols such as polyethoxylated glycol, polypropoxylated glycol or acetylenic glycols.

Suitable scale inhibitors include components such as phosphate esters, phosphino carboxylate, polyacrylates, polymethacylate, styrene-maleic anhydride, sulfonates, maleic anhydride co-polymer, and acrylate-sulfonate co-polymer.

The basic composition of the nanofluids of the present invention can be routinely optimized for selective applications. For example, nitrates and silicates are known to provide aluminum protection. Borates and nitrites can be added for ferrous metal protection, and benzotriazole and tolytriazole can be added for copper and brass protection.

Physical Agitation:

The nanofluid of the present invention is prepared by dispersing a mixture of the appropriate carbon nanoparticles, metal oxide nanoparticles and surfactant(s), and other optional chemical additives, using a physical method to form a stable suspension of nanoparticles in a thermal transfer fluid. A variety of physical mixing methods are suitable for use in the present invention, including a conventional mortar and pestle mixing, high shear mixing, such as with a high speed mixer, homogenizers, microfluidizers, high impact mixing, and ultrasonication methods.

Among these methods, ultrasonication is the least destructive to the structures of carbon nanoparticles. Ultrasonication can be done either in the bath-type ultrasonicator, or by the tip-type ultrasonicator. Typically, tip-type ultrasonication is for applications which require higher energy output. Ultrasonication at a intermediate intensity for up to 60 minutes, and usually in a range of from 10 to 30 minutes is desired to achieve better homogeneity. Additionally, the mixture is ultrasonicated intermittently to avoid overheating. It is well known that overheating can cause covalent bond breakage in a carbon nanotube, which cause the nanotube to lost its beneficial physical properties. As such, the carbon nanoparticle-containing mixture is generally energized for a predetermined period of time with a break in between. Each energizing period is no more than about 30 min, no more than about 15 min, no more than 10 min, no more than 5 min, no more than 2 min, no more than 1 min, or no more than 30 sec. The break between ultrasonication pulses provides the opportunity for the energized carbon nanoparticles to dissipate the energy. The break is typically no less than about 1 min, no less than about 2 min, no less than about 5 min, or between about 5 to about 10 min.

The raw material mixture may also be pulverized by any suitable known dry or wet grinding method. One grinding method includes pulverizing the raw material mixture in the fluid mixture of the present invention to obtain a concentrate, and the pulverized product may then be dispersed further in a liquid medium with the aid of the dispersants described above. However, pulverization or milling often reduces the carbon nanotube average aspect ratio.

It will be appreciated that the individual components can be separately blended into the thermal transfer fluid, or can be blended therein in various subcombinations, if desired. Ordinarily, the particular sequence of such blending steps is not critical. Moreover, such components can be blended in the form of separate solutions in a diluent. It is preferable, however, to blend the components used in the form of an additive concentrate, as this simplifies the blending operations, reduces the likelihood of blending errors, and takes advantage of the compatibility and solubility characteristics afforded by the overall concentrate.

Physical agitation methods particularly suitable for making nanogrease are those employing relatively high shearing or dispersing devices, including, but not limited to, Morehouse mills, Buxton knife mills, Gaulin homogenizers, colloid mills, rotating knife-edge mills, rotor-stator mills, and three-roll mills. In an exemplary embodiment, after a final grease composition is achieved, the resulting grease is generally passed one or more times through one of these shearing or dispersing devices to enhance the characteristics (e.g., smoothness, shear stability, oil separation and bleed properties) and to maximize the thickening power of a grease thickener, such as carbon nanotubes.

Formulation:

The nanofluid of the present invention is a dispersion of carbon nanoparticles, metal oxide nanoparticles and at least one surfactant with a net negative charge in a thermal transfer fluid. In general, the nanofluid contains no less than about 80%, no less than about 85%, no less than about 90%, or no less than about 95% by weight of a thermal transfer fluid. The nanofluid contains no greater than about 30%, no greater than 15%, no greater than 10%, no greater than about 5%, no greater than about 2.5%, or no greater than about 1%, no greater than about 0.5%, no greater than about 0.2%, no greater than about 0.1%, or no greater than about 0.05% by weight of carbon or non-carbon nanoparticles.

The nanofluid includes one or more surfactants with a net negative charge to stabilize the nanoparticle dispersion. The nanofluid contains from about no greater than 10%, no greater than 1%, no greater than 0.5%, no greater than 0.2%, from 0.1 to about 30%, from about 1 to about 20%, from about 1 to about 15%, or from about 1 to about 10% by weight of a surfactant.

The nanofluid may further comprise other additives to improve chemical and/or physical properties. Typically, the amount of these additives together is no greater than 10% by weight of the nanofluid. Nevertheless, the total amount of all the ingredients of the nanofluid together should equal to 100%.

The metal oxide nanoparticles of the present invention exhibit a positive surface charge. In addition, such metal oxides all have a characteristic pH point of zero charge, or "pHpzc" at which pH the metal oxide nanoparticle surface is neutral. In the practice of the present invention, the pH of the nanofluid is adjusted to below this pHpzc. This forms an additional positively charged ionic barrier around the metal oxide nanoparticles that facilitates inter-particle repulsion between particles, which further enhances the stability of the dispersion. In one example, when the metal oxide nanoparticles have a pHpzc of between 9 and 10, the pH of the nanofluid is usually between 7 and 9. In a specific example, the nanofluids comprise SWNTs, along with metal oxide (MgO, CuO or $Al_2O_3$) nanoparticles and SDS or SDBS at a pH of between 7 and 9.

By providing a transfer fluid having an appropriate pH, a charge effect between the surfactant molecules and the non-carbon nanoparticles can be maintained. Carbon nanoparticles can then be maintained in suspension due to the charge effect between the head groups on the surfactant molecules.

As mentioned above, the net charge of the surfactant(s) is(are) negative, and the metal oxide nanoparticles have a positive charge. This allows a small network of metal oxide nanoparticles to form, thereby orienting and connecting the carbon nanoparticle, which in turn allows heat to flow along the length of the carbon nanoparticle such as a carbon nanotube, thereby significantly increasing the thermal conductivity of the nanofluid.

Such nanofluids can be exhibited microscopically to form large rope structure comprising many carbon nanotubes that have been partially exfoliated into smaller ropes through the use of the surfactants, such as NaDDBS. In other examples individual carbon nano-tubes that are obtained by the addition of MgO at pH 7 with the surfactant NaDDBS may be coated with what is believed to be a random assortment of surfactant on the surface of the carbon nano-tubes. These nanofluids can exyibit ring formations.

The hydrophilic thermal transfer fluid may contain one or more hydrophilic molecules. For example, the hydrophilic thermal transfer fluid may contain water, aliphatic alcohols, alkylene glycols, or various mixtures thereof. The hydrophilic thermal transfer fluid may be a two-component mixture which contains water and ethylene glycol in various proportions. The hydrophilic thermal transfer fluid may contain about 0.1 to about 99.9%, about 20 to about 80%, about 40 to about 60%, or about 50% by volume of water.

The hydrophilic thermal transfer fluid may be a three-component mixture. For example, the hydrophilic thermal transfer fluid contains water, ethylene glycol, and diethylene glycol in various proportions. The hydrophilic thermal transfer fluid may contain about 0.1 to about 99.9% by volume of water, about 0.1 to 99.9% by volume of ethylene glycol, and about 0.1 to 99.9% by volume of diethylene glycol; and about 20 to about 80%, about 40 to about 60%, or about 50% by volume of water or ethylene glycol. Typically, diethylene glycol constitutes a minor component of the hydrophilic thermal transfer fluid, in no greater than about 20%, no greater than about 10%, or no greater than about 5% of the total volume. Nevertheless, the total amount of all the components in a hydrophilic thermal transfer fluid together equals to 100%.

The hydrophilic nanofluid may be prepared by dispersing carbon nanoparticles and metal oxide nanoparticles, along with the surfactant(s) directly into a mixture of a hydrophilic thermal transfer fluid and other additives with a physical agitation, such as ultrasonication. However, the order of addition of the individual components is not critical for the practice of the invention.

The hydrophilic nanofluid of carbon nanoparticles thus produced has enhanced thermal properties and physical and chemical characteristics. Addition of solid carbon nanoparticles, in particular, carbon nanotubes, enhances both thermal conductivity and lowers the freezing point of the thermal conductive fluid. Incorporation of about 0.05% by weight of carbon nanotubes, the thermal conductivity is increased from 0.45 to about 0.48-0.50, which is an about 6 to 11% increase. In addition, the freezing point of the thermal transfer fluid is also lowered significantly.

EXAMPLES

Carbon nanotubes from several commercial sources were used in the following examples and their information is summarized in Table 1. Specifically, SWNT-CNI and SWNT-RIC were produced using a chemical vapor deposition process ("VCD"), whereas SWNT-CAR was produced via an arc discharge method.

Often, several grades of carbon nanotubes are available from each company. For instance, CNI supplies "D" grade, HiPCO purified, and fluorinated carbon nanotubes. The "D" grade carbon nanotubes contain roughly 35% ash content along with some metal catalysts impurities. HiPCO purified and fluorinated carbon nanotubes contain less than 10% ash. Fluorinated carbon nanotubes have their end cap functionalized with fluorine. The carbon nanotubes from Carbolex (SWNT-CAR) are AP grade without purification. The carbon nanotubes from Rice University have been functionalized with sulfonated aryl groups, allowing them to be more easily dispersed in polar solvents such as water and methanol.

Metal oxide nanoparticles used in the present invention are magnesium oxide (MgO) with an average diameter of 12 nm, aluminum oxide ($Al_2O_3$) with an average diameter of 40 nm, copper oxide (CuO) with an average diameter of 33 nm, and magnesium hydroxide ($Mg(OH)_2$) with an average diameter of 26.8 nm. These metal oxide nanoparticles were all obtained from Sigma Aldrich (St. Louis, Mo.).

In the following examples, thermal conductivity was measured using a Hot Disk™ Thermal Constant Analyzer (Uppsala, Sweden). The senor was a 2 mm nickel double spiral sensor covered by a thin kapton layer. After each measurement, the sample was allowed to sit for 15 min before the next measurement. Both particle size and zeta-potential were determined using NICOMP 380 ZLS by Particle Sizing Systems. Zeta potential was measured by using the electrophoretic light scattering method (ELS). Particle size is obtained by use of the multi-angle dynamic light scattering technique (DLS). Ultrasonication was performed using a Branson model 450 ultrasonicator with a half-inch disruptor horn. Transmission electron microscopy (TEM) was performed using the Hitachi H-7000FA Electron Microscope.

TABLE 1

Carbon Nanotubes

| Abbreviation | Product Information | Commercial Source |
| --- | --- | --- |
| MWNT-HMSI | MWNT with a diameter of 10-20 nm and a length of 0.5-40 micrometers | Helix Material Solution Inc |
| MWNT-MER | MWNT with a diameter of 140 ± 30 nm, a length of 7 ± 2 micrometers, and a purity of over 90%. | Materials and Electrochemical Research Corporation |
| MWNT-RAO | MWNT with diameter 20-25 nm, | RAO |
| SWNT-MER | SWNT 0.7-1.2 nm in diameter, 10-50 micron lengths. | MER |
| SWNT-CAR | Purified CAR SWNT (AP CAR) | CarboLex |
| SWNT-D-CNI | Grade-D SWNT | CNI |
| F-SWNT-CNI | Purified F-SWNT | CNI |
| SWNT-H-CNI | HiPco SWNT | CNI |
| SWNT-RIC | Functionalized SWNT | Rice University |

Example 1

Thermal Conductivities of Hydrophilic Thermal Transfer Fluids

For comparison with carbon nanoparticle-containing nanofluids, the thermal conductivities of hydrophilic thermal fluids used in the present invention were measured. The thermal conductivity of distilled water was determined to be 0.628±0.003 W/mK, which is slightly higher than the reported value of 0.613 W/mK (Eastman, et al., "Thermal transport in nanofluids," *Annual Review of Materials Research*, 2004, 34:219-246). The thermal conductivity of ethylene glycol was determined to be 0.2731±0.003 W/mK, which is also slightly higher than the value of 0.256 W/mK as reported in the aforementioned reference. The thermal conductivity of a solution containing 50% by volume of ethylene glycol and 50% by volume of water was determined to be 0.415±0.006 W/mK. The thermal conductivity of PRE-STONE™, which contains 50% by volume of ethylene glycol and 50% by volume of water, was determined to be 0.434±0.002 W/mK. The thermal conductivities of these two ethylene glycol solutions are very similar to the value of 0.434 W/mK as reported in the aforementioned reference.

Example 2

Thermal Conductivities of Hydrophilic Nanofluids Comprising SWNT and MgO

A series of hydrophilic nanofluids that contains SWNT, MgO nanoparticles, and SDBS in deionized water were prepared using a mortar and pestle via hand. The SWNTs used herein are SWNT-D-CNI (Grade D). The final pH of the dispersions was 7. The resulting nanofluids were stable for at least three months. The thermal conductivities of these nanofluids are summarized in Table 2, together with their compositions. Surprisingly, the SWNT concentrations in the nanofluids do not seem to have significant effects on their thermal conductivities.

TABLE 2

Thermal Conductivities of Hydrophilic Nanofluids Containing SWNT and MgO

| SWNT (wt. %) | MgO (wt. %) | SDBS (wt. %) | Thermal Conductivity (W/mK) | Average (W/mK) |
|---|---|---|---|---|
| 0.017 | 0.05 | 0.17 | 0.6781 | 0.6650 ± 0.015 |
|  |  |  | 0.6677 |  |
|  |  |  | 0.6493 |  |
| 0.033 | 0.033 | 0.33 | 0.6618 | 0.6627 ± 0.005 |
|  |  |  | 0.6600 |  |
|  |  |  | 0.6559 |  |
|  |  |  | 0.6684 |  |
|  |  |  | 0.6673 |  |
| 0.033 | 0.017 | 0.17 | 0.6755 | 0.6643 ± 0.0073 |
|  |  |  | 0.6641 |  |
|  |  |  | 0.6663 |  |
|  |  |  | 0.6584 |  |
|  |  |  | 0.6574 |  |

Example 3

Effect of pH on the Thermal Conductivities of Hydrophilic Nanfluids Comprising SWNT and MgO It was observed that the pH value of the nanofluid plays an important role in its thermal conductivity and stability. The nanofluid that has SWNT and MgO is stable at pH below 8 and its thermal conductivity also does vary much. However, when the pH of the nanofluid was adjusted around 10 or higher, the particles in the nanofluid started to separated from the suspension and led to a decrease in its thermal conductivity (Table 3). The hydrophilic nanofluid in this study comprises 0.017% by weight of SWNT-D-CNI, 0.017% by weight of MgO, and 0.17 by weight of SDBS at pH 10 in water.

TABLE 3

Thermal Conductivity of A Hydrophilic Nanofluid Containing SWNT and MgO at pH 10

| Time (min) | Thermal conductivity (W/mK) |
|---|---|
| 15 | 0.6709 ± 0.005 |
| 30 | 0.6452 ± 0.006 |
| 45 | 0.6294 ± 0.005 |

Example 4

Effect of the Grade of SWNT on the Thermal Conductivity of a Hydrophilic Nanfluid Comprising SWNT and MgO Three different grades of SWNTs were used in this study and the results are summarized in Table 4. Each hydrophilic nanofluid in the study comprises 0.017% by weight of SWNT, 0.017% by weight of MgO, and 0.17 by weight of SDBS at pH 7 in deionized water. No significant effect of the SWNT grade was observed on the thermal conductivities of the hydrophilic nanofluids.

TABLE 4

The Effect of the Grade of SWNT on the Thermal Conductivity

| SWNT | Thermal Conductivity (W/mK) | Average (W/mK) |
|---|---|---|
| SWNT-D-CNI | 0.6755 | 0.6643 ± 0.0073 |
|  | 0.6641 |  |
|  | 0.6663 |  |
|  | 0.6584 |  |
|  | 0.6574 |  |
| SWNT-H-CNI | 0.6781 | 0.6699 ± 0.0116 |
|  | 0.6617 |  |
| SWNT-AP-CAR | 0.6470 | 0.6476 ± 0.002 |
|  | 0.6499 |  |
|  | 0.6460 |  |

Example 5

Effect of Surfactants on Hydrophilic Nanfluids Comprising SWNT and MgO

Three different surfactants were tested, SDBS, SDS, and CTAB. The two anionic surfactants, SDBS and SDS, work equivalently well in dispersing the carbon nanotubes in water, and water and ethylene glycol mixtures. However, the nanofluid that contains the cationic CTAB exhibits a poor stability.

When dispersed via ultrasonication for 90 seconds, the resulted anionic surfactant-containing nanofluid was stable for a few days. The SDS-containing nanofluid shows a thermal conductivity of 0.6565±0.007 W/mK, which is similar to that of the SDBS-containing nanofluid as described herein above. For anionic surfactants, the optimal ratio of surfactant vs. the carbon nanotubes for effective dispersion of carbon nanotubes was found to be about 10:1 (surfactant:carbon nanotubes, w/w).

Example 6

Effect of Non-Carbon Nanoparticles on SWNT-Containing Hydrophilic Nanfluids

In addition to MgO, two additional non-carbon nanoparticles were used in this study, CuO and $Al_2O_3$. CuO has a pH point of zero charge ("pHpzc") of 9.5, whereas $Al_2O_3$ has a pHpzc of 9.2. The pH effect on the thermal conductivities of the $Al_2O_3$-containing nanofluids suggests that the pH should be no greater than the pHpzc value of the non-carbon nanoparticle. Each nanofluid in Table 5 comprises 0.017% by weight of SWNT, 0.017% by weight of non-carbon nanoparticlues, and 0.17 by weight of SDBS at the pH as indicated in water.

TABLE 5

The Effect of Non-carbon Nanoparticles on the Thermal Conductivities of Hydrophilic Nanofluids

| Non-Carbon Nanoparticles | pH | Thermal Conductivity (W/mK) | Average (W/mK) |
|---|---|---|---|
| CuO | 7 | 0.6839 | 0.6816 ± 0.004 |
|  |  | 0.6842 |  |
|  |  | 0.6768 |  |
| $Al_2O_3$ | 7 | 0.6541 | 0.6658 ± 0.008 |
|  |  | 0.6716 |  |
|  |  | 0.6724 |  |
|  |  | 0.6654 |  |
| $Al_2O_3$ | 5 | 0.6743 | 0.6696 ± 0.008 |
|  |  | 0.6632 |  |

TABLE 5-continued

The Effect of Non-carbon Nanoparticles on the Thermal
Conductivities of Hydrophilic Nanofluids

| Non-Carbon Nanoparticles | pH | Thermal Conductivity (W/mK) | Average (W/mK) |
|---|---|---|---|
| $Al_2O_3$ | 10.75 | 0.6669<br>0.6818<br>0.6619<br>0.6252<br>0.6212<br>0.6344 | 0.6269 ± 0.007 |

Example 7

Thermal Conductivities of Hydrophilic Nanofluids Containing Functionalized SWNT

For comparison, a series of hydrophilic nanofluids that contain functionalized SWNT-RIC were also prepared. Due to the polar sulfonated aryl group attached to the sidewall of the SWNT, SWNT-RIC was readily dispersed into water, a 50-50 water and ethylene glycol mixture, and ethylene glycol. The dispersions were stable over long time periods. Dispersions of the SWNT-RIC were obtained through stirring with a glass rod, or via a few second ultrasonication (10 seconds or less).

The thermal conductivity of a nanofluid that comprises 0.5% by weight of SWNT-RIC in water was determined to be 0.6397±0.0006 W/mK. The thermal conductivity of a nanofluid that comprises 0.1% by weight of SWNT-RIC in water was determined to be 0.6389±0.0005 W/mK.

The thermal conductivity of a nanofluid that comprises 0.5% by weight of SWNT-RIC in a solution that contains 50% by volume of water and 50% by volume of ethylene glycol was determined to be 0.4441±0.0190 W/mK. The thermal conductivity of a nanofluid that comprises 0.1% by weight of SWNT-RIC in a solution that contains 50% by volume of water and 50% by volume of ethylene glycol was determined to be 0.4483±0.0228 W/mK. There seems to be a slight increase in thermal conductivity from 0.415 W/mK to about 0.444 W/mK. It is interesting to note that the solution is stable at a pH of 10, but if the pH is changed to 7, the solution of SWNT-RIC started to agglomerate and the dispersion worsens considerably, leading to decrease in thermal conductivity.

The examples set forth above are provided to give those of ordinary skill in the art with a complete disclosure and description of how to make and use the preferred embodiments of the compositions and the methods, and are not intended to limit the scope of what the inventors regard as their invention. Modifications of the above-described modes for carrying out the invention that are obvious to persons of skill in the art are intended to be within the scope of the following claims. All publications, patents, and patent applications cited in this specification are incorporated herein by reference as if each such publication, patent or patent application were specifically and individually indicated to be incorporated herein by reference.

What is claimed is:

1. A nanofluid composition comprising 0.017-0.05% by weight carbon nanoparticles, 0.017-0.05% by weight metal oxide nanoparticles having a pHpzc, and at least one surfactant having a net negative charge in a hydrophilic thermal transfer fluid, wherein the composition has a pH between 7 and 9 and the pH is below the pHpzc of the metal oxide nanoparticles.

2. The nanofluid composition of claim 1, wherein the carbon nanoparticles are selected from the group consisting of diamond nanoparticles, graphite nanoparticles, fullerenes, carbon nanotubes, and carbon fibers.

3. The nanofluid composition of claim 1, wherein the hydrophilic thermal transfer fluid is selected from the group consisting of water, alkyl alcohols, alkylene glycols, and combinations thereof.

4. The nanofluid composition of claim 3, wherein the alkylene glycol is ethylene glycol or diethylene glycol.

5. The nanofluid composition of claim 1, wherein the carbon nanoparticles are carbon nanotubes.

6. The nanofluid composition of claim 1, wherein the carbon nanoparticles are single wall nanotubes (SWNTs).

7. The nanofluid composition of claim 1, wherein the carbon nanoparticles are multi-wall nanotubes (MWNTs).

8. The nanofluid composition of claim 1, wherein the metal oxide nanoparticle comprises a metal oxide selected from the group consisting of MgO, CuO and $Al_2O_3$.

9. The nanofluid composition of claim 1, wherein the surfactant is selected from the group consisting of sodium dodecylbenzenesulfonate (SDBS) and sodium dodecyl sulfate (SDS).

10. The nanofluid composition of claim 1, wherein the carbon nanoparticle is a single walled nanotube (SWNT), the metal oxide nanoparticle comprises MgO, CuO or $Al_2O_3$, and at least one surfactant is sodium dodecyl sulfate (SDS) or sodium dodecylbenzenesulfonate (SDBS).

11. A method for making a nanofluid composition comprising the steps of:
    a) mixing together 0.017-0.05% by weight carbon nanoparticles, 0.017-0.05% by weight metal oxide nanoparticles having a pHpzc, and at least one surfactant having a net negative charge into a hydrophilic thermal transfer fluid; and
    b) adjusting the pH to between 7 and 9 and below the pHpzc of the metal oxide nanoparticles.

12. The method of claim 11, wherein the carbon nanoparticles are selected from the group consisting of diamond nanoparticles, graphite nanoparticles, fullerenes, carbon nanotubes, and carbon fibers.

13. The method of claim 11, wherein the hydrophilic thermal transfer fluid is selected from the group consisting of water, alkyl alcohols, alkylene glycols, and combinations thereof.

14. The method of claim 13, wherein the alkylene glycol is ethylene glycol or diethylene glycol.

15. The method of claim 11, wherein the carbon nanoparticles are carbon nanotubes.

16. The method of claim 11, wherein the carbon nanoparticles are single wall nanotubes (SWNTs).

17. The method of claim 11, wherein the carbon nanoparticles are multi-wall nanotubes (MWNTs).

18. The method of claim 11, wherein the metal oxide nanoparticle comprises a metal oxide selected from the group consisting of MgO, CuO and $Al_2O_3$.

19. The method of claim 11, wherein the surfactant is selected from the group consisting of sodium dodecylbenzenesulfonate (SDBS) and sodium dodecyl sulfate (SDS).

* * * * *